US011931760B2

(12) United States Patent
Wang

(10) Patent No.: US 11,931,760 B2
(45) Date of Patent: Mar. 19, 2024

(54) SPRAY HEAD STRUCTURE

(71) Applicant: ECP Incorporated, Woodridge, IL (US)

(72) Inventor: Wenyuan Wang, Keelung (TW)

(73) Assignee: ECP Incorporated, Woodridge, IL (US)

( * ) Notice: Subject to any disclaimer, the term of this patent is extended or adjusted under 35 U.S.C. 154(b) by 373 days.

(21) Appl. No.: 17/051,034

(22) PCT Filed: Aug. 14, 2018

(86) PCT No.: PCT/CN2018/100475
§ 371 (c)(1),
(2) Date: Dec. 3, 2020

(87) PCT Pub. No.: WO2020/034099
PCT Pub. Date: Feb. 20, 2020

(65) Prior Publication Data
US 2023/0158521 A1 May 25, 2023

(51) Int. Cl.
*B05B 7/06* (2006.01)
*B05B 3/02* (2006.01)
(Continued)

(52) U.S. Cl.
CPC ............ *B05B 7/0441* (2013.01); *B05B 3/022* (2013.01); *B05B 7/0075* (2013.01); *B05B 7/066* (2013.01); *B05B 7/2435* (2013.01)

(58) Field of Classification Search
CPC ..... B05B 7/0441; B05B 7/0075; B05B 7/066; B05B 7/2435; B05B 3/026; B05B 3/022; B05B 3/06
See application file for complete search history.

(56) References Cited

U.S. PATENT DOCUMENTS 1,720,165 A 7/1929 Bloom et al.
2,270,579 A 1/1942 Chamberlin et al.
(Continued)

FOREIGN PATENT DOCUMENTS

CN 2808324 Y 8/2006
CN 2910373 Y 6/2007
(Continued)

OTHER PUBLICATIONS

NPL04—https://omnexus.specialchem.com/product-categories/thermoplastics-pp-polypropylene#Patents.
(Continued)

*Primary Examiner* — Joseph A Greenlund
(74) *Attorney, Agent, or Firm* — Kowert, Hood, Munyon, Rankin & Goetzel, P.C.; Gareth M. Sampson

(57) ABSTRACT

Provided is a spray head structure (1), comprising an airflow pipe (10), a rotary member (30), a load member (70), a tan component (100), a spoiler pipe (41) and a liquid flow pipe (50), wherein the rotary member (30) is rotatable sleeved on the airflow pipe (10), the load member (70) is mounted at the rotary member (30) to increase the load so as to improve the torsion of the rotary member, the fan component (100) is mounted at the rotary member (30). the spoiler pipe (41) is fixedly arranged on the rotary member (30) and is provided with a spoiler channel (41) in communication with the airflow pipe (10), and the spoiler channel (41) is provided with an outlet end (411), and an injection path forming an acute angle 0 with the axis of the airflow pipe (10), Gas at a high flow rate enables the spoiler pipe to drive the rotary member to rotate relative to the airflow pipe, such that the fan component is driven to rotate to form an airflow, so that the air flow can flow from the fan component to the outlet end to improve the atomization effect thereof, or can flow from the outlet end to the fan component to perform the suction of impurities.

14 Claims, 4 Drawing Sheets

(51) Int. Cl.

| | |
|---|---|
| ***B05B 7/00*** | (2006.01) |
| ***B05B 7/04*** | (2006.01) |
| ***B05B 7/24*** | (2006.01) |

(56) References Cited

U.S. PATENT DOCUMENTS

| | | | | |
|---|---|---|---|---|
| 2,679,084 | A | 5/1954 | Heitt | |
| 2,933,093 | A | 4/1960 | Handyside | |
| 3,488,001 | A * | 1/1970 | Donald | B05B 3/08 239/229 |
| 3,727,949 | A | 4/1973 | Kleykamp et al. | |
| 4,044,953 | A | 8/1977 | Vogel | |
| 4,369,850 | A | 1/1983 | Barker | |
| 4,370,771 | A | 2/1983 | Gonzalvo | |
| 4,841,760 | A | 6/1989 | Ferguson | |
| 5,052,623 | A | 10/1991 | Nordeen | |
| 5,533,673 | A | 7/1996 | Wilson et al. | |
| 5,725,153 | A | 3/1998 | Wang et al. | |
| 5,795,626 | A | 8/1998 | Gabel et al. | |
| 5,898,970 | A | 5/1999 | Straiton | |
| 6,003,787 | A | 12/1999 | Fisher | |
| 6,126,086 | A | 10/2000 | Browner et al. | |
| 6,178,570 | B1 | 1/2001 | Denst et al. | |
| 6,490,753 | B1 | 12/2002 | Chen | |
| 6,609,269 | B2 | 8/2003 | Kasper | |
| 6,860,437 | B1 | 3/2005 | Amendt et al. | |
| 6,883,732 | B2 * | 4/2005 | Hasegawa | B05B 3/00 239/602 |
| 7,032,837 | B2 | 4/2006 | Eddins et al. | |
| 7,225,503 | B1 | 6/2007 | Lenkiewicz et al. | |
| 7,458,485 | B2 | 12/2008 | Amron | |
| 7,530,474 | B2 | 5/2009 | Amron | |
| 7,568,635 | B2 | 8/2009 | Micheli | |
| 7,753,059 | B2 * | 7/2010 | Hasegawa | B05B 3/00 134/109 |
| 7,784,148 | B2 | 8/2010 | Lenkiwicz et al. | |
| 7,878,423 | B2 | 2/2011 | Hasegawa | |
| 8,056,830 | B1 * | 11/2011 | Pedersen | B05B 3/028 239/227 |
| 8,336,789 | B2 * | 12/2012 | Kuo | B05B 7/2435 239/315 |
| 8,353,467 | B2 | 1/2013 | Hasegawa | |
| 8,480,011 | B2 * | 7/2013 | Endo | B08B 1/00 239/416.5 |
| 8,534,301 | B2 | 9/2013 | Nottingham et al. | |
| 8,690,077 | B2 | 4/2014 | Sendo | |
| 8,807,453 | B2 * | 8/2014 | Hsieh | B05B 3/1035 239/226 |
| 8,985,360 | B2 | 3/2015 | Chen | |
| 9,144,810 | B2 | 9/2015 | Bosua | |
| 9,211,560 | B1 * | 12/2015 | Chen | B05B 3/06 |
| 9,475,071 | B2 | 10/2016 | Endo | |
| 9,597,694 | B2 * | 3/2017 | Bosua | B05B 7/0416 |
| 10,182,696 | B2 * | 1/2019 | Dehn | A47L 11/34 |
| 10,189,034 | B2 | 1/2019 | Endo | |
| 10,259,002 | B1 * | 4/2019 | Kuo | B05B 7/2459 |
| 10,343,177 | B1 * | 7/2019 | Endo | B08B 1/002 |
| 10,562,078 | B2 * | 2/2020 | Dehn | B08B 5/04 |
| 11,330,954 | B2 * | 5/2022 | Dehn | A47L 11/4086 |
| 2003/0029933 | A1 * | 2/2003 | Hasegawa | B05B 3/00 239/416.5 |
| 2003/0182755 | A1 | 10/2003 | Dicioccio | |
| 2003/0213481 | A1 | 11/2003 | Bell | |
| 2004/0149836 | A1 | 8/2004 | Herhold | |
| 2004/0177469 | A1 | 9/2004 | Sadaune et al. | |
| 2005/0173559 | A1 | 8/2005 | Eddins et al. | |
| 2006/0065760 | A1 * | 3/2006 | Micheli | B05B 3/1064 239/340 |
| 2006/0208104 | A1 | 9/2006 | DeBoer et al. | |
| 2008/0048056 | A1 | 2/2008 | Pichler | |
| 2008/0197067 | A1 | 8/2008 | Ross et al. | |
| 2009/0057443 | A1 * | 3/2009 | Sendo | B05B 3/06 239/405 |
| 2009/0065607 | A1 | 3/2009 | Gardner et al. | |
| 2009/0078293 | A1 | 3/2009 | Hasegawa | |
| 2009/0188067 | A1 | 7/2009 | White et al. | |
| 2009/0208367 | A1 | 8/2009 | Calio et al. | |
| 2010/0176219 | A1 | 7/2010 | Hasegawa | |
| 2010/0320289 | A1 * | 12/2010 | Kuo | B08B 3/026 239/290 |
| 2011/0132405 | A1 | 6/2011 | Lowenstein | |
| 2011/0232685 | A1 | 9/2011 | Paffrath et al. | |
| 2012/0286065 | A1 * | 11/2012 | Lin | B05B 7/2435 239/225.1 |
| 2012/0286071 | A1 * | 11/2012 | Lin | B05B 7/2435 239/525 |
| 2013/0001318 | A1 | 1/2013 | Sendo | |
| 2013/0056558 | A1 * | 3/2013 | Chen | B08B 3/028 239/302 |
| 2014/0008457 | A1 * | 1/2014 | Bosua | B05B 15/55 239/104 |
| 2014/0061334 | A1 * | 3/2014 | Liao | B05B 7/2435 239/315 |
| 2014/0083467 | A1 | 3/2014 | Dehn | |
| 2014/0224278 | A1 | 8/2014 | Endo | |
| 2015/0000705 | A1 * | 1/2015 | Dehn | B08B 5/04 15/345 |
| 2015/0266041 | A1 * | 9/2015 | Liao | B05B 3/06 239/373 |
| 2015/0375272 | A1 | 12/2015 | Dehn | |
| 2017/0113234 | A1 | 4/2017 | Endo | |
| 2017/0120266 | A1 * | 5/2017 | Fu | B05B 7/064 |
| 2019/0191953 | A1 | 6/2019 | Dehn | |
| 2019/0193094 | A1 | 6/2019 | Endo | |
| 2022/0111408 | A1 * | 4/2022 | Rieben | A47L 11/4075 |
| 2023/0158521 | A1 * | 5/2023 | Wang | B08B 3/028 239/8 |

FOREIGN PATENT DOCUMENTS

| | | | |
|---|---|---|---|
| CN | 203417802 | U | 2/2014 |
| CN | 206613781 | U | 11/2017 |
| DE | 1806634 | | 5/1970 |
| DE | 202018101888 | U1 * | 5/2018 |
| DK | 168196 | B1 | 2/1994 |
| EP | 2255885 | A1 | 12/2010 |
| EP | 2587082 | B1 | 12/2013 |
| JP | H0437635 | A | 2/1992 |
| JP | H10286494 | A | 10/1998 |
| JP | H11123350 | A | 5/1999 |
| JP | 200051800 | | 2/2000 |
| JP | 2001104840 | A | 4/2001 |
| JP | 2003154294 | A | 5/2003 |
| JP | 2007228900 | A | 9/2007 |
| JP | 2007228901 | | 9/2007 |
| TW | 242279 | | 3/1995 |
| TW | M260325 | | 4/2005 |
| TW | 200603895 | | 12/2006 |
| TW | 200840650 | | 10/2008 |
| TW | 201244828 | | 11/2012 |
| TW | M442195 | | 12/2012 |
| TW | M472566 | | 2/2014 |
| TW | 201524609 | | 7/2015 |
| TW | I617360 | | 3/2018 |
| WO | 1996013333 | | 5/1996 |
| WO | 1997039620 | | 10/1997 |
| WO | 2007006074 | A1 | 1/2007 |
| WO | 2007131533 | A1 | 11/2007 |
| WO | 2013060794 | A1 | 5/2013 |
| WO | 2013140173 | A2 | 9/2013 |

OTHER PUBLICATIONS

NPL05—Claim Construction Order from U.S. District Court Central District of California, *Total Import Solutions, Inc.* v. *Dehn's Innovations LLC*, Judge Andre Birotte Jr., Case No. CV17-03917-AB (AFMx) issued Jul. 11, 2018.

(56) References Cited

OTHER PUBLICATIONS

International Search Report and Written Opinion, International Application No. PCT/CN2018/100475; dated Apr. 18, 2019; 5 pgs.

* cited by examiner

SPRAY HEAD STRUCTURE

TECHNICAL FIELD

The present application relates to a spray head structure, particularly to a spray head structure provided with a load member and a fan component.

BACKGROUND ART

With the improvement of the quality of life including clothing, food, housing, transportation and entertainment, the means of transportation have also been upgraded from bicycles and motorcycles to sedans and SUVs. The cars running on the road will inevitably be contaminated with sand and dust. Therefore, after the cars have run for a period of time, they must be cleaned, For this reason, many car owners will have their cars washed in car washing stations during holidays. The cleaning worker soaks foam with detergent, nibs the car body with the foam and then flushes away the detergent froth with jet water. However, during the cleaning process of the car body, often the pressure of the jet water is not high enough to remove the dirt on the car body, leaving marks of dirt and sand after the car is washed.

Therefore, some people have developed an air spray gun, which uses high-pressure air to improve the cleaning effect of the air spray gun. The air spray gun uses a T-shaped tube to connect a lever, a. liquid drum and a nozzle respectively, and the bottom of the lever is connected to a tube, which is connected to an air compressor. The lever controls the high pressure air of the air compressor to enter the T-shaped tube to produce a Venturi effect so as to draw out the liquid in the liquid drum and then spray the liquid out via a nozzle.

However, the air spray gun only has a small spray area. Therefore, if the cleaning worker wants to use the air spray gun to quickly clean a large area, it is liable for the cleaning worker to skip part of the cleaning area due to rapid sweep, thereby causing unclean locations, In order to achieve a good cleaning effect, the cleaning worker has to spend a lot of time repeatedly cleaning the same area. Therefore, how to improve the overall cleaning. ability of the air spray gun has become an issue that designers need to solve at present.

SUMMARY OF THE INVENTION

An embodiment of the present application provides a spray head structure to solve the problem of an insufficient cleaning ability of the air spray gun in the prior art.

A spray head structure disclosed by an embodiment of the present application is for spraying a gas at a high flow rate and a liquid and comprises an airflow pipe, a rotary member, a load member, a fan component, a spoiler pipe and a liquid flow pipe. The airflow pipe is provided with an airflow channel for circulation of the gas at a high flow rate. The rotary member is rotatably sleeved on the airflow pipe. The load member is mounted at the rotary member to increase the load of the rotary member so as to improve the torsion of the rotary member. The fan component is mounted at the rotary member. The spoiler pipe is fixedly arranged on the rotary member, provided with a spoiler channel and connected to the airflow pipe. The airflow channel is in communication with the spoiler channel. The spoiler channel is provided with an outlet end, and an injection path at the outlet end. The injection path forms an acute angle with the axis of the airflow pipe. The liquid flow pipe is provided with a liquid inlet end and a liquid outlet end opposite to each other. The liquid inlet end is located outside the airflow pipe, and the liquid outlet end passes through the airflow pipe to the airflow channel, extends from the airflow channel to the outlet end of the spoiler channel, and allows a liquid to be sprayed out from the liquid outlet end and mixed and atomized with a gas at a high flow rate. Here, the gas at a high flow rate is sprayed from the airflow channel toward the outlet end, so that the outlet end of the spoiler pipe rotates relative to the axis due to eccentric force. When the rotary member rotates, it will drive the fan component to rotate and form an airflow. The outlet end is located in the flow path of the airflow.

According to the spray bead. structure disclosed in the above embodiment, since the fan component and the load member are jointly mounted on the rotary member, when a gas at a high flow rate flows through the spoiler pipe, it will drive the fan component and the load member to rotate. Here, the rotating fan component will generate an airflow, which flows from the fan component toward the outlet end to improve the atomization effect of the liquid and the gas at a high flow rate, or flows from the outlet end toward the fan component to perform the suction of impurities adjacent to the outlet end. Further, the load member increases the load of the rotary member, so as to improve the torsion of the rotary member. In this way, under the settings of the fan component and the load member, the overall cleaning ability of the spray head structure can be further improved.

The above description of the content of the present application and the following description of implementation manners are used to demonstrate and explain the spirit and principle of the present application, and provide a further explanation on the protection scope of the claims of the present application

BRIEF DESCRIPTION OF THE DRAWINGS

The accompanying drawings described here are used to provide further understanding on the present application and form part of the present application. The schematic embodiments of the present application and description thereof are used to explain the present application and do not constitute an improper limitation to the present application. In the drawings.

DETAILED DESCRIPTION

In order to make the object, technical solutions and advantages of the present application clearer, the technical solutions of the present application will be described clearly and completely hereinafter in conjunction with the specific embodiments and corresponding drawings of the present application. Apparently, the described embodiments are only some of the embodiments of the present application, rather than all of the embodiments. Other embodiments obtained by those of ordinary skill in the art based on the embodiments of the present application without creative efforts all fall within the protection scope of the present application.

The technical solutions provided by the embodiments of the present application will be described in detail in conjunction with the accompanying drawings.

Figure 1:
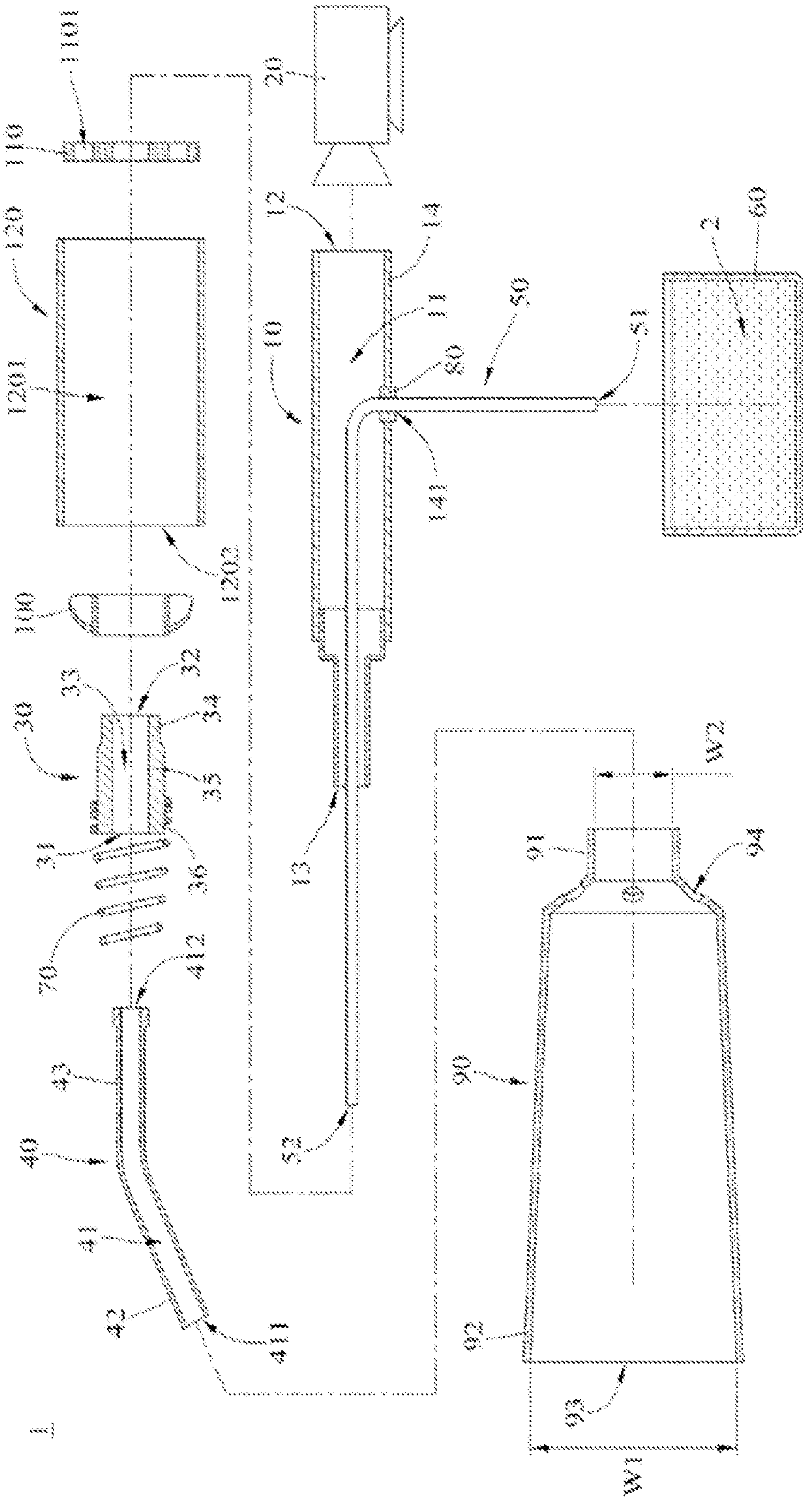
FIG. 1 is an exploded sectional view of a spray head structure disclosed by a first: embodiment of the present application.
Figure 2:
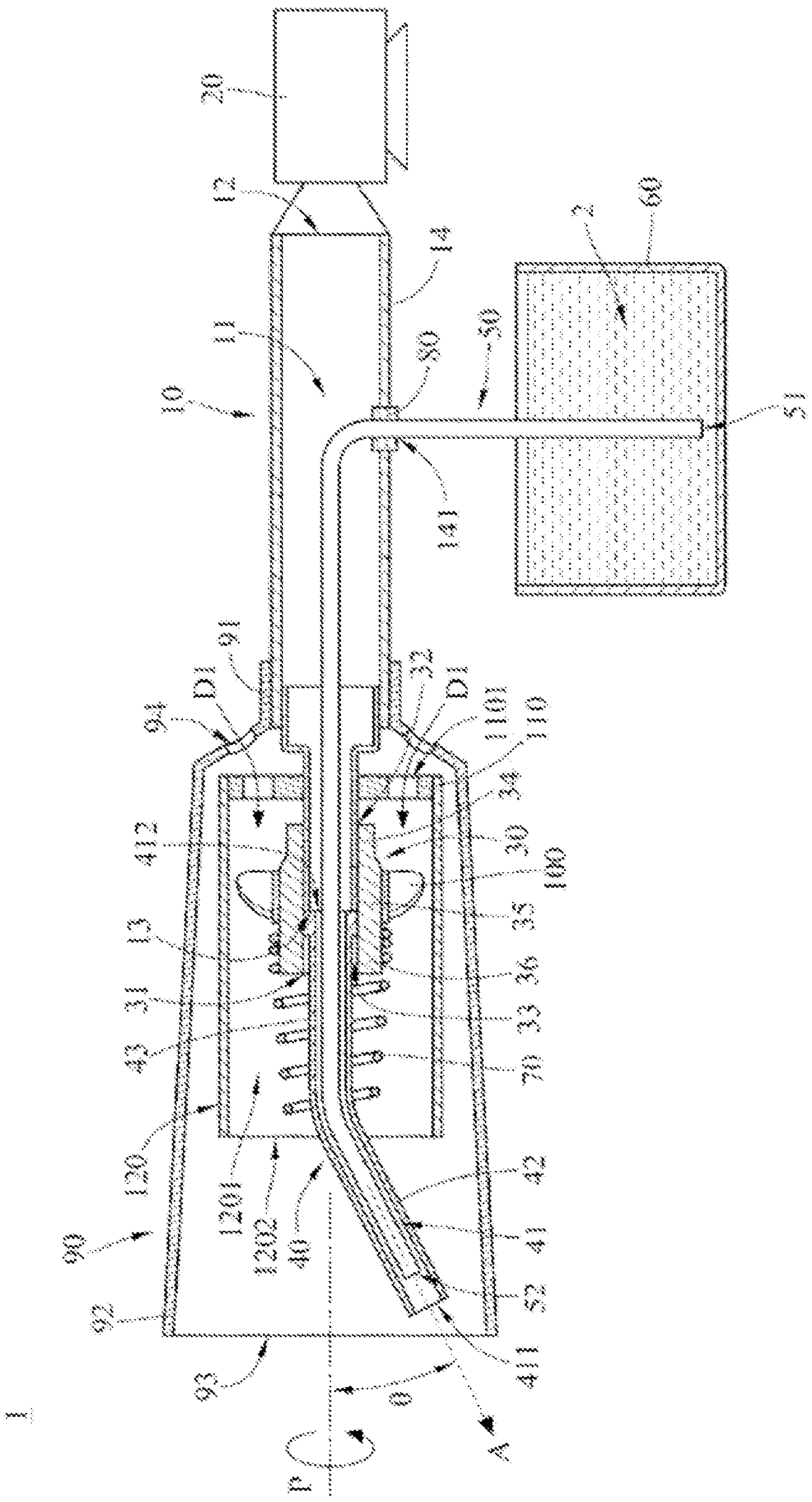
FIG. 2 is a schematic view of operation of FIG. 1.

Please refer to FIG. 1 and FIG. 2. FIG. 1 is an exploded sectional view of a spray head structure disclosed by a first embodiment of the present application. FIG. 2 is a schematic view of operation of FIG. 1.

The spray head structure 1 provided by this embodiment is for spraying and atomizing a gas at a high flow rate and a liquid. Further, the spray head structure 1 for example can be used in a cleaning spray gun for cleaning car bodies. The spray head structure 1 comprises an airflow pipe 10, a gas compressor 20, a rotary member 30, a spoiler pipe 40, a liquid flow pipe 50, a liquid storage tank 60 and a load member 70.

The airflow pipe 10 is provided with a through airflow channel 11. The two opposite ends of the airflow pipe 10 are provided with a gas inlet end 12 and a gas outlet end 13 respectively. The gas inlet end 12 is connected to a gas compressor 20. The ins compressor 20 is used to provide a gas at a high flow rate.

The rotary member 30 is rotatably sleeved on the airflow pipe 10. In more detail, the rotary member 30 is provided with a first end 31 and a second end 32 opposite to each other, and a through channel 33 that extends from the first end 31 to the second end 32. The first end 31 is rotatably sleeved on the airflow pipe 10, so that part of the airflow pipe 10 is located inside the through channel 33.

The spoiler pipe 40 is fixedly arranged on the rotary member 30 and is provided with a spoiler channel 41. Part of the spoiler pipe 40 is connected to the airflow pipe 10 so that the airflow channel 11 is in communication with the spoiler channel 41. In detail, the spoiler channel 41 is provided with an outlet end 411 and a combined end 412 opposite to each other The spoiler channel 41 is in communication with the airflow channel 11 as the combined end 412 is connected to the gas outlet end 13. The gas at a high flow rate provided by the gas compressor 20 may flow via the gas inlet end 12 through the airflow channel 11 and the spoiler channel 41 in order and be sprayed out from the outlet end 411 of the spoiler channel 41. In detail, the spoiler pipe 40 comprises a bent pipe body 42 and a combined pipe body 43. which are connected to each other, and the spoiler channel 41 runs through the bent pipe body 42 and the combined pipe body 43. Here, the outlet end 411 is located at an end of the bent pipe body 42 farther from the combined pipe body 43, while the combined end 412 is located at an end of the combined. pipe body 43 farther from the bent pipe body 42, and the combined pipe body 43 is connected to the airflow pipe 10. The outlet end 411 and the combined end 412 are not on the same axis, causing an injection path A of the gas at a high flow rate when being sprayed out from the outlet end 411 to form an acute angle θ with an axis P of the airflow pipe 10.

When the gas at a high flow rate flows through the spoiler channel 41 to the outlet end 411 and is sprayed out, the gas generates a reaction force on the outlet end 411. As the outlet end 411 is not located on the axis P, and the injection path A is not parallel to the axis P, when the reaction three acts on the outlet end 411, the outlet end 411 is in a state of eccentric force, causing the spoiler pipe 40 to drive the rotary member 30 to rotate together. In the process of rotation of the spoiler pipe 40, because the injection path A of the gas at a high flow rate when being sprayed out from the outlet end 411 forms an acute angle θ with the axis P of the airflow pipe 10, the outlet end 411 of the spoiler pipe 40 makes a circular motion around the axis P.

The liquid flow pipe 50 is provided with a liquid inlet end 51 and a liquid outlet end 52 opposite to each other. The liquid outlet end 52 is located outside the airflow pipe 10, and the liquid inlet end 51 is located inside a liquid storage tank 60. Further, the airflow pipe 10 is provided with a circular sidewall 14 that forms the airflow channel 11, and the circular sidewall 14 is provided with an opening 141 in communication with the airflow channel 11. In detail, the liquid flow pipe 50 passes through the opening 141 and enters the airflow channel 11, and the liquid flow pipe 50 extends toward the outlet end 411 of the spoiler channel 41 so that the liquid outlet end 52 is located outside the airflow pipe 10. The liquid storage tank 60 contains a cleaning liquid 2, such as water, soap liquid and cleansing liquid. The liquid flow pipe 50 draws the cleaning liquid 2 via the liquid inlet end 51. In addition, the spray head structure 1 further comprises a leak stopper 80, which is located at the opening 141 and is used for sealing a gap between the liquid flow pipe 50 and the opening 141 to prevent the gas in the airflow channel 11 from leaking out of the gap.

The load member 70 is, for example, a compression spring, is mounted at a second end of the rotary member 30 and covers the spoiler pipe 40. The load member 70 is used to increase the load of the rotary member 30, so as to improve the torsion of the rotary member 30. In this embodiment, the setting of the load member 70 as a compression spring is not intended to limit the present application, In other embodiments, other elements such as a collar can be used instead.

In this embodiment, the spray head structure 1 further comprises a nozzle mask 90. The nozzle mask 90 is provided with a third end 91, a fourth end 92 and a nozzle tip 93. The third end 91 and the fourth end 92 are located on two opposite sides of the nozzle mask 90, the nozzle tip 93 is located at the fourth end 92, and the outer diameter W1 of an opening of the third end 91 of the nozzle mask 90 is smaller than the outer diameter W2 of an opening of the fourth end 92. The third end 91 of the nozzle mask 90 is sleeved on the gas outlet end 13 of the airflow pipe 10 so that the rotary member 30, the spoiler pipe 40 and the load member 70 are all located inside the nozzle mask 90, and the outlet end 411 of the spoiler pipe 40 corresponds to the nozzle tip 93. Further, when the outlet end 411 of the spoiler pipe 40 rotates around the axis P, the maximum rotation diameter of the outlet end 411 is smaller than the diameter of the nozzle tip 93, so the outlet end 411 will not interfere with the nozzle tip 93, and the spoiler pipe 40 can rotate smoothly. Further, the nozzle mask 90 can also protect the spoiler pipe 40 to prevent the spoiler pipe 40 from being damaged by an external force.

When a gas at a high flow rate enters the airflow channel 11 and the spoiler channel 41 via the gas inlet end 12 in order and passes through the liquid outlet end 52 of the liquid flow pipe 50 inside the spoiler channel 41, a Venturi effect will be generated at the liquid outlet end 52 of the liquid flow pipe 50 inside the spoiler channel 41, causing the pressure at the liquid outlet end 52 to be smaller than the pressure at the liquid inlet end 51. In this way, due to the influence of the pressure difference between the liquid outlet end 52 and the liquid inlet end 51, the cleaning liquid 2 in the liquid storage tank 60 is sucked from the liquid inlet end 51 to the liquid outlet end 52 and discharged. Next, the cleaning liquid 2 discharged from the liquid outlet end 52 will be mixed with the gas at a high flow rate in the spoiler channel 41 and atomized, and then sprayed out from the outlet end 411 together with the gas at a high flow rate. While the cleaning liquid 2 and the gas at a high flow rate are sprayed out from the outlet end 411, the outlet end 411 rotates around the axis P, so that the gas-liquid mixed cleaning jet water is continuously sprayed in a swirling state. Therefore, the cleaning jet water in a swirling spray state can increase the spray area of the spray head structure 1, thereby increasing the cleaning area. On the other hand, the nozzle mask 90 limits the spray range of the outlet end 411 to avoid an excessive and uncontrolled spray range of the cleaning jet water which will affect the operation of the operator.

Further, as the load member 70 is mounted on the rotary member 30, increasing the load of the rotary member 30, so as to improve the torsion of the rotary member 30, the overall cleaning ability of the spray head structure 1 can be improved. In detail, please refer to the table below. The table below shows a comparison between the spray head structure 1 of this embodiment and the spray head structure 1 without the load member 70 under the same water volume, in terms of air volume, rotation speed without supply of water, rotation speed with supply of water, and water consumption time. Therefore, it can be known that compared with the spray head structure 1 without the load member 70, the spray head structure 1 of this embodiment has good performance in terms of the items such as air volume, rotation speed without supply of water, rotation speed with supply of water, and water consumption time, so the load member 70 can improve the overall cleaning ability of the spray head structure 1.

| | Rotary spray head structure with a load member | Rotary spray head structure without a load member |
|---|---|---|
| Volume of water drum (mL) | 600 | 600 |
| Air volume (L/min) | 125 | 102 |
| Rotation speed of the spray head structure without supply of water (rpm) | 4100 | 6600 |
| Rotation speed of the spray head structure with supply of water (rpm) | 3900 | 6300 |
| Water consumption time | 12 min 49 s | 4 min 37 s |

Further, the spray head structure 1 of this embodiment further comprises a fan component 100, a composite member 110 and a wind scooper 120, and the rotary member 30 comprises a sleeving section 34, a mounting section 35 and an extending section 36 on the outer surface, which are connected to each other. The mounting section 35 of the rotary member 30 is located between the sleeving section 34 and the extending section 36, and the first end 31 is located at an end of the sleeving section 34 farther from tire mounting section 35, and the second end 32 is located at an end of the extending section 36 farther from the mounting section 35. The sleeving section 34 of the rotary member 30 is sleeved on the airflow pipe 10, and the load member 70 and die fan component 100 are coaxial and are arranged at the extending section 36 and the mounting section 35 respectively.

Further, the nozzle mask 90 is further provided with a through opening 94, which is located between the third end 91 and the fourth end 92. The composite member 110 is sleeved on the airflow pipe 10 and provided with an air inlet 1101. The air inlet 1101 corresponds to the through opening 94. The wind scooper 120 is located inside the nozzle mask 90 and provided with an air channel 1201 and an air outlet 1202 in communication with the air channel 1201. One end of the wind scooper 120 opposite to the air outlet 1202 is sleeved on the airflow pipe 10. In more detail, one end of the wind scooper 120 opposite to the air outlet 1202 is mounted at the composite member 110, so as to be sleeved on the airflow pipe 10. The combined pipe body 43 of the spoiler pipe 40, the fan component 100, the rotary member 30 and the load member 70 are located inside the air channel 1201 of the wind scooper 120.

As shown in FIG. 2, in this embodiment, when the rotary member 30 rotates, it will drive the fan component 100 to rotate together, so that an airflow passes through the through opening 94, enters the wind scooper 120 from the air inlet 1101, passes through the air channel 1201 and the air outlet 1202 along a first direction D1 and leaves the wind scooper 120. Because the wind scooper 120 has an effect of collecting wind, the airflow can further enhance the degree of mixing and atomization of the gas at a high flow rate and the cleaning liquid 2, thereby improving the overall cleaning effect of the spray head structure 1. In addition to the elect of collecting wind, the wind scooper 120 can also ensure that tire load member 70 will not shake excessively when the load member 70 rotates.

Figure 3:
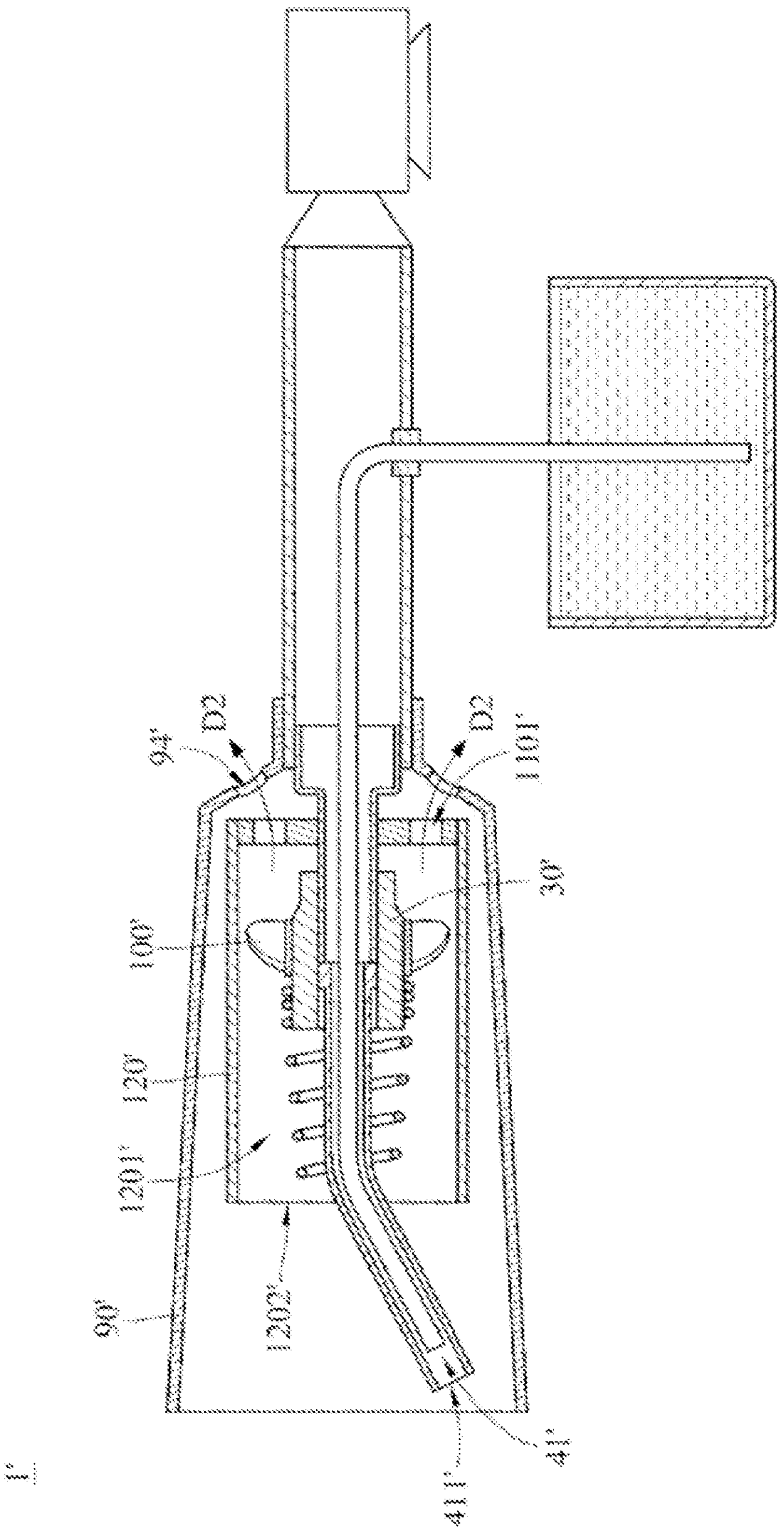
FIG. 3 is a schematic view of operation of a spray head structure disclosed by a second embodiment of the present application.

In this embodiment, the airflow generated by the fan component 100 flows from the air inlet 1101 to the air outlet 1202 along the first direction D1, but it is not limited to this. Please refer to FIG. 3, FIG. 3 is a schematic view of operation of a spray head structure disclosed by a second embodiment of the present application. In this embodiment, the flow direction of the airflow generated by the fan component 100' is opposite to the fan component 100 of FIG. 1. In detail, when the rotary member 30' drives the fan component 100' to rotate, an airflow enters the wind scooper 120' from the air outlet 1202' and then the airflow passes through the air channel 1201', the air inlet 1101' and the through opening 94' in order along a second direction D2 and leaves the nozzle mask 90'. Because the wind scooper 120' has an effect of collecting wind, it can further enhance the ability of the spray head structure 1' to suck impurities adjacent to the outlet end 411' of the spoiler channel 41', thereby improving the overall cleaning effect of the spray head structure 1.

Figure 4:
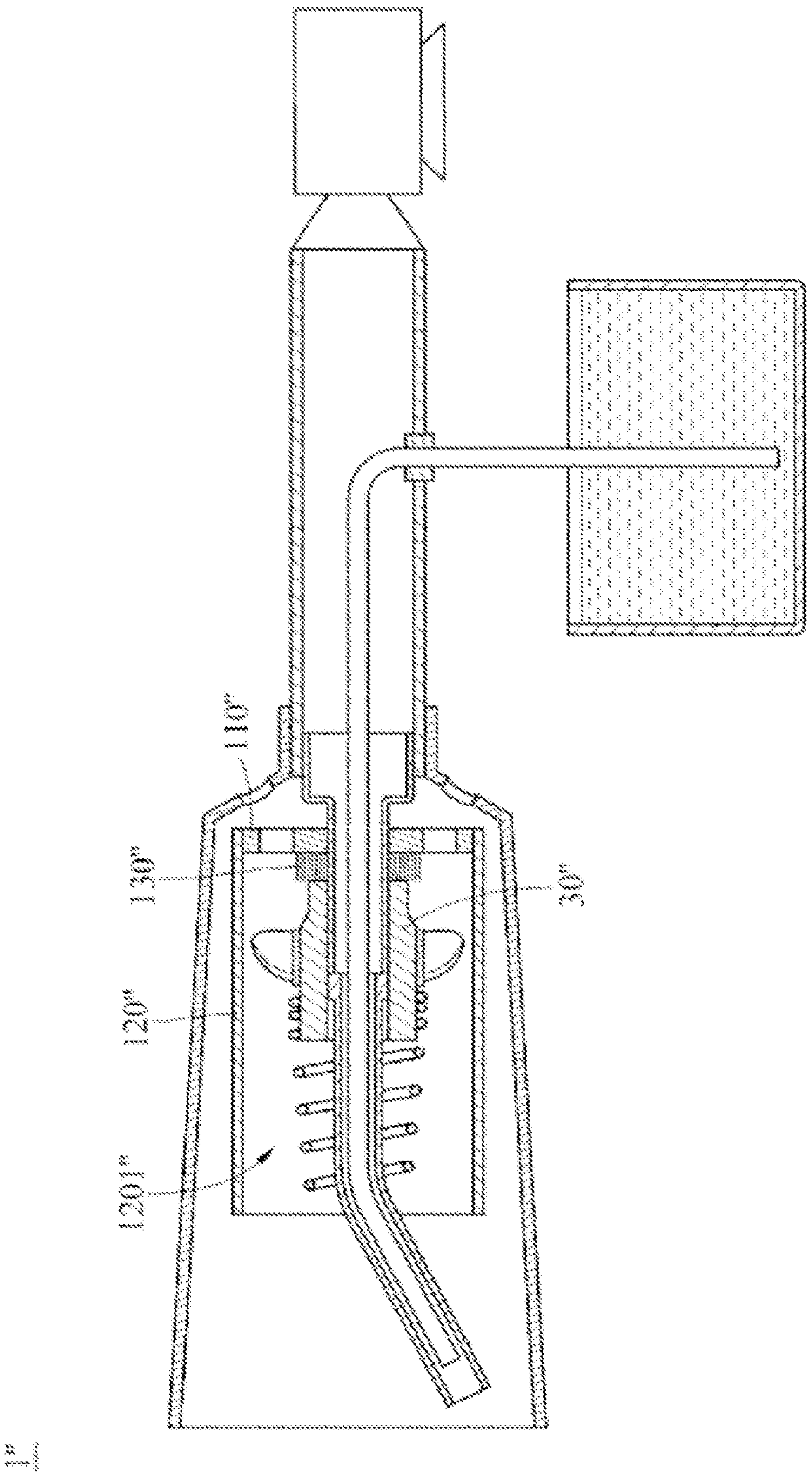
FIG. 4 is a schematic view of operation of a spray head structure disclosed by a third embodiment of the present application.

In this embodiment, the load member and the fan component are used to improve the overall cleaning effect of the spray head structure, but it is not limited to this. Please refer to FIG. 4. FIG. 4 is a schematic view of operation of a spray head structure disclosed by a third embodiment of the present application.

The spray head stricture 1" in this embodiment further comprises a torsion adjuster 130". The torsion adjuster 130" is, for example, a brush structure. Further, the torsion adjuster 130" is arranged at the composite member 110", located inside the air channel 1201" of the wind scooper 120" and in contact with the rotary member 30", while other detail components of the spray head structure 1" are similar to the detail components of the spray head structure 1 in the embodiment shown in FIG. 1, so they are not described again.

In this embodiment, when the rotary member 30" rotates and brushes the torsion adjuster 130", the torsion adjuster 130" will provide a resistance against the rotary member 30", causing increase of torsion of the rotary member 30", thereby further enhancing the overall cleaning ability of the spray head structure 1.

According to the spray head structure disclosed in the above embodiment, since the fan component and the load member are jointly mounted on the rotary member, when a gas at a high flow rate flows through the spoiler pipe, it will drive the fan component and the load member to rotate.

Here, the rotating fan component will generate an airflow, which flows from the fan component toward the outlet end to improve the atomization effect of the liquid and the gas at a high flow rate, or flows from the outlet end toward the fan component to perform the suction of impurities adjacent to the outlet end. Further, the load member increases the load of the rotary member, so as to improve the torsion of the rotary member. In this way, under the settings of the fan component and the load member, the overall cleaning ability of the spray head structure can be further improved.

Further, the setting of a torsion adjuster arranged at the composite member can increase the torsion of the rotary member, so the overall cleaning ability of the spray head structure is further improved.

The foregoing descriptions are embodiments of the present application and are not intended to limit the present application. For those skilled in the art, the present application may have various changes and modifications. All modifications, identical replacements and improvements made without departing from the spirit and principle of the present application shall be within the protection scope of the present application.

It should be noted that, unless otherwise defined, all technical and scientific terms used herein have the same meanings as those commonly understood by those skilled in the technical field of the present application. The terms used in the description of the present application herein are only for the purpose of describing, specific embodiments and not intended to limit the present application. The term "and/or" used herein includes any and all combinations of one or more relevant listed items. The terms "vertical," "horizontal," "first," "second" and similar expressions used herein are for illustrative purposes only, and do not mean the only implementation manner.

The invention claimed is:

1. A spray head structure, for spraying a gas and a liquid, wherein the spray head structure comprises:

an airflow pipe, provided with an airflow channel for circulation of the gas at a flow rate;

a rotary member, rotatably sleeved on the airflow pipe;

a load member, mounted at the rotary member to increase the load of the rotary member and improve torsion of the rotary member, wherein the load member is a compression spring;

a fan component, mounted at the rotary member, wherein the load member and the fan component are coaxially arranged at the rotary member;

a spoiler pipe, fixedly arranged on the rotary member, provided with a spoiler channel and connected to the airflow pipe, wherein the airflow channel is in communication with the spoiler channel, the spoiler channel is provided with an outlet end, and an injection path at the outlet end, and wherein the injection path forms an acute angle with an axis of the airflow pipe; and a liquid flow pipe, provided with a liquid inlet end and a liquid outlet end opposite to each other, wherein the liquid inlet end is located outside the airflow pipe, and the liquid outlet end passes through the airflow pipe to the airflow channel, extends from the airflow channel to the outlet end of the spoiler channel, and allows a liquid to be sprayed out from the liquid outlet end and mixed and atomized with the gas at the high flow rate;

wherein the gas at the high flow rate is sprayed from the airflow channel toward the outlet end, such that the outlet end of the spoiler pipe rotates relative to the axis due to eccentric force, while when the rotary member rotates, the rotary member will drive the fan component to rotate and form an airflow, and the outlet end is located in a flow path of the airflow;

wherein the rotary member is provided with a first end and a second end opposite to each other, and wherein the load member is located on a side of the fan component farther from the first end.

2. The spray head structure according to claim 1, wherein a through channel that extends from the first end to the second end, and wherein the first end of the rotary member is rotatably sleeved on the airflow pipe, such that part of the airflow pipe and part of the spoiler pipe are located inside the through channel, while the outlet end of the spoiler pipe is located outside the through channel.

3. The spray head structure according to claim 2, wherein the rotary member comprises a sleeving section, a mounting section, and an extending section on an outer surface, which are connected to each other, the mounting section being located between the sleeving section and the extending section, the first end being located at an end of the sleeving section farther from the mounting section, and the second end being located at an end of the extending section farther from the mounting section, and wherein the sleeving section is sleeved on the airflow pipe, the load member is mounted at the extending section, and the fan component is sleeved on the mounting section.

4. The spray head structure according to claim 1, wherein the spray head structure further comprises a wind scooper, the wind scooper being provided with an air channel and an air outlet in communication with the air channel, wherein one end of the wind scooper opposite to the air outlet is sleeved on the airflow pipe, and wherein part of the spoiler pipe, the fan component, the rotary member, and the load member are located inside the air channel of the wind scooper.

5. The spray head structure according to claim 4, wherein the spray head structure further comprises a composite member, the composite member being sleeved on the airflow pipe, wherein one end of the wind scooper opposite to the air outlet is sleeved on the composite member, and wherein the composite member is provided with an air inlet, such that the airflow flows from the air inlet to the air outlet.

6. The spray head structure according to claim 4, wherein the spray head structure further comprises a composite member, the composite member being sleeved on the airflow pipe, wherein one end of the wind scooper opposite to the air outlet is mounted at the composite member, and wherein the composite member is provided with an air inlet, such that the airflow flows from the air inlet to the air outlet.

7. The spray head structure according to claim 5 or 6, wherein the spray head structure further comprises a torsion adjuster, which is arranged at the composite member, located inside the air channel of the wind scooper, and in contact with the rotary member.

8. The spray head structure according to claim 4, wherein the spray head structure further comprises a nozzle mask, the nozzle mask being provided with a nozzle tip, wherein one end of the nozzle mask opposite to the nozzle tip is sleeved on the airflow pipe, the wind scooper is located inside the nozzle mask, and the outlet end corresponds to the nozzle tip.

9. The spray head structure according to claim 1, wherein the spoiler pipe further comprises a bent pipe body and a combined pipe body, which are connected to each other, the outlet end being located at the bent pipe body, and wherein the combined pipe body is connected to the airflow pipe.

10. The spray head structure according to claim 1, wherein the spray head structure further comprises a gas compressor, the airflow pipe being provided with a gas inlet end and a gas outlet end opposite to each other, the gas inlet end being connected to the gas compressor, and the gas outlet end being connected to the spoiler pipe.

11. The spray head structure according to claim 1, wherein the spray head structure further comprises a liquid storage tank, and wherein the liquid inlet end of the liquid flow pipe is located inside the liquid storage tank.

12. The spray head structure according to claim 1, wherein the airflow pipe is provided with a circular sidewall that forms the airflow channel, the circular sidewall being provided with an opening, and wherein the liquid flow pipe passes through the opening.

13. The spray head structure according to claim 12, wherein the spray head structure further comprises a leak stopper, the leak stopper being arranged at the opening, and wherein the liquid flow pipe passes through the leak stopper.

14. The spray head structure according to claim 1, wherein the load member covers the spoiler pipe.

* * * * *